(No Model.) 2 Sheets—Sheet 1.
J. E. & E. M. MITCHELL.
PLOW
No. 473,517. Patented Apr. 26, 1892.
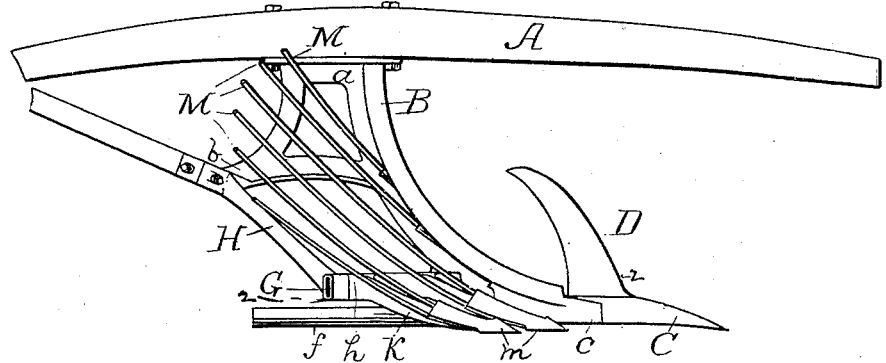
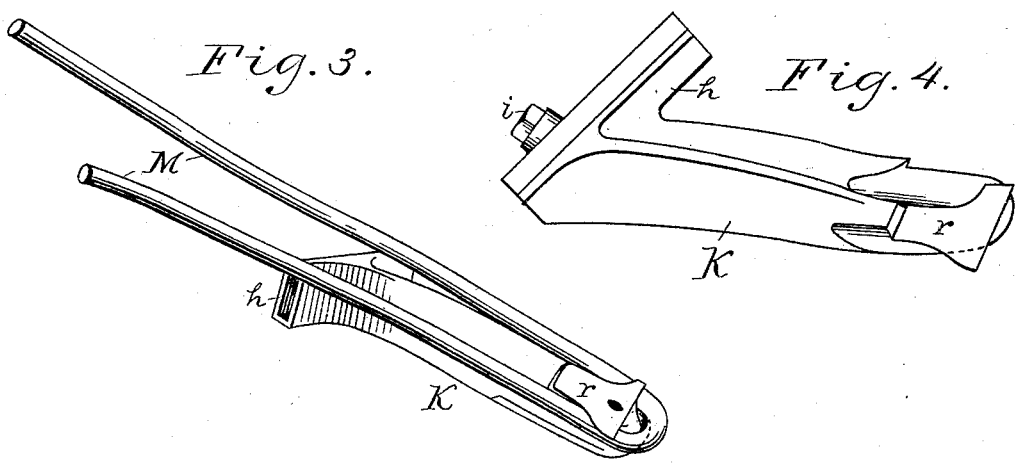
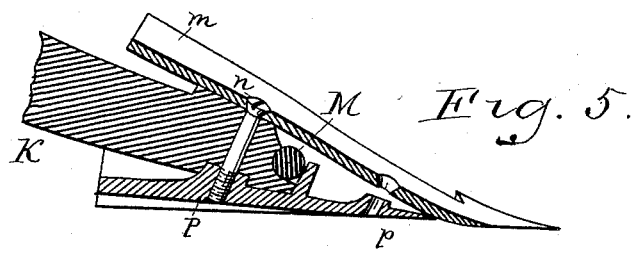
Witnesses:
Sue Carney
P. B. Coolidge
Inventors:
John E. Mitchell &
Elma M. Mitchell,
By Frank D. Thomason
Atty.

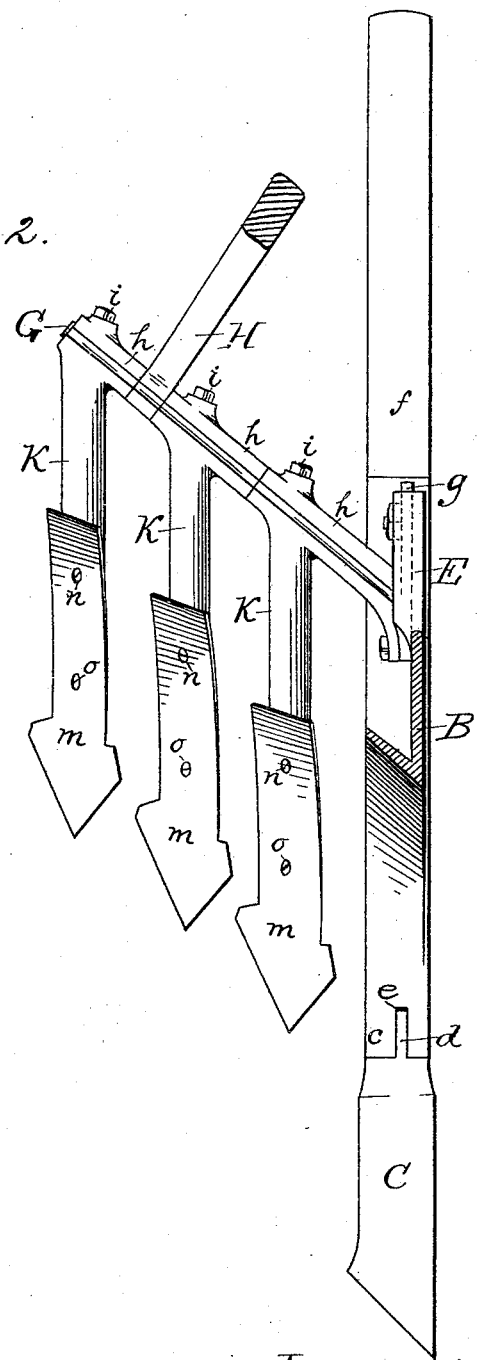

UNITED STATES PATENT OFFICE.

JOHN E. MITCHELL AND ELMA M. MITCHELL, OF SALEM, IOWA.

PLOW.

SPECIFICATION forming part of Letters Patent No. 473,517, dated April 26, 1892.

Application filed June 1, 1891. Serial No. 394,651. (No model.)

*To all whom it may concern:*

Be it known that we, JOHN E. MITCHELL and ELMA M. MITCHELL, both of Salem, Henry county, Iowa, have invented certain new and useful Improvements in Plows, of which the following is a full, clear, and exact description, reference being had to the accompanying drawings, and to the letters of reference marked thereon.

Our invention has for its object the reduction of the friction caused by contact of the soil with the plowshare to a minimum; to make a convertible plow which can by slight changes, perfectly under the control of the plowman, be adapted to operate successfully and satisfactorily in soils of different natures, and to so construct the plow that should any of the essential parts thereof become broken or in need of repair it can be easily removed and replaced without the necessity of removing and throwing away as useless any considerable part thereof, substantially as hereinafter fully described, and as illustrated in the drawings, in which—

Figure 1 is a side elevation of our invention. Fig. 2 is a transverse horizontal section taken on line 2 2, Fig. 1. Figs. 3 and 4 are perspective and plan views, respectively, of the shovel-braces. Fig. 5 is a vertical longitudinal section through the shovel and brace, showing its manner of connection.

In the drawings, A represents the plow-beam, and B represents the standard. The upper part of the standard is made with a rearwardly-extending somewhat square-shaped frame $a$, which is provided, preferably, with a rearward elongation $b$, to which the handles are suitably connected. The lower part of the standard curves forward and is constructed with the concave wedge-shaped edge similar to the forward edge of the common plowshare, with its landside on the perpendicular plane parallel with the line of draft, and its lower forward end merges into a toe $c$, which is provided with a longitudinal socket $c'$ for the reception of the tang $d$ of a suitable plow-point C. This plow-point may be of a one-lobe-spear shape, as shown in Fig. 2, and it may, if desired, be constructed with an upwardly-projecting spur-colter D. Its tang is preferably cylindrical and fits into a corresponding socket. In this case, however, we provide its upper surface with a longitudinal feather $d'$, which enters a corresponding slot $e$, so as to steady said point and secure the point by a transverse sunken screw passing through said toe $c$ and the plow-point tang, or otherwise.

The heel E of the standard has secured and extending rearwardly from it a horizontal landside extension-bar $f$, which is preferably cylindrical and which follows and is in alignment with the plow-point. This heel consists of a vertical web of metal, and just above where it connects with the extension $f$ it is made thicker and is provided with a longitudinal horizontal opening or socket F, which is designed for the reception of the tang $g$ of the rack-bar G, as shown. The angle of this tang from the inner end of said rack-bar is about forty-five degrees, more or less, so that when said tang is secured in said socket F, by means of transverse sunken bolts or otherwise, the angle of the said rack-bar to the line of draft will be about that shown in Fig. 2. The outer portion of the rack-bar is preferably braced by means of the brace H, and passes through a suitable opening in the lower end of the same. The upper end of this brace is secured to the elongation $b$ of the frame $a$ of the standard by means of bolts or otherwise.

K represents longitudinal prongs whose rear ends are provided with a tubular holder $h$, which is set at an angle to the longitudinal plane of said arms corresponding to the angle that the rack-bar maintains to the line of draft. This tube $h$ of each prong is provided with a longitudinal opening therethrough, the tranverse contour of which is the obverse of the transverse shape of the rack-bar, over which said tube is slipped so as to support said prong, as shown, and to which it is secured by a set-screw $i$. We can, according to the nature of the soil to be plowed, place and secure on the rack-bar two of these prongs or three or more thereof. In the case of two being used they are made to occupy the position shown in Fig. 1, with the brace-bar coming against the outer end of the outer prong, and in the case of three being used we prefer to place the said bar between the first two prongs, contiguous to the standard, and the third one as shown. The bars, however, may come on the outside of the third one, if desired, without affecting the construction and operation of the plow. The prongs K project downward slightly from the tube $h$, are of corresponding length, and are provided with suitable shovel-points $m$ on their forward ends. The forward ends of these prongs are of a suitable construction, so as to adapt them for holding the independent and disconnected shovel-points and for holding and covering the forward ends of the independent mold-bars M M.

The shovel-points $m$ consist of a spear-shaped plate, which is secured to the upper surface of the prongs by means of a sunken screw $n$, and its forward end is further braced by means of a ground plate or shoe P, which is secured to the under side of the said prong by means of the same sunken screw $n$. This shoe is mainly for the purpose of protecting the under side of the forward end of the prongs from digging into the soil and by presenting a smooth exposed surface reducing the friction.

In addition to the blind-screw $n$ for securing the shovel-point and shoe to the prong we can, if desired, unite the two parts directly together near their forward ends by means of a sunken screw.

The bars M are preferably made in pairs by originally taking one bar to the length of the two bars and bending it double, as shown in Figs. 3 and 4, and when securing them in position we run their ends longitudinally under lateral wings of a boss $r$ until their bends rest in a seat surrounding the forward end of the said prongs, on the upper side of which the said boss is made. The bend of the bars, as thus shown, is secured rigidly in place by being clamped in position by the shovel-point and by a transverse web built across the upper surface of the ground-plate, which comes in front of the extremity of the prong K and in front of the bend of the said bar. The rearward sweep of these bars is such that the plane touching their forward surfaces would correspond to the curvature of the mold-boards of a plowshare. The pairs are not, as will be observed, parallel, but separate, as they extend to the rear, so that the space between their rear ends is greater than between their forward portions. If desired, instead of having these bars made in pairs, as shown, each bar may be independent and separate from the others. In this event, however, two bars would be secured under and projecting to the rear from each shovel-point.

In order to more securely hold the rack-bar in place, we provide its angle, or the end thereof from which the tang extends, with a forwardly-projecting toe, which is secured to the heel of the standard by a sunken transverse bolt, which, if desired, also passes through and suitably holds a toe $s$, made on the contiguous end of the tubular holder $h$ of the prong K nearest the standard.

The two most essential features of our invention to which we desire most to call attention are the removable prongs for carrying the mold-bars and the mold-bars themselves. The latter can be easily replaced should they become bent or injured, as likewise can the prongs H, and the said bars, by spreading as they project to the rear, enable us to accomplish the same effect as is accomplished by the mold-board of the plowshare, but with considerable less friction.

What we claim as new is—

1. The combination, with a plow beam and standard, of a mold-board consisting of a series of disconnected points removably braced to the standard and a series of bars arranged in pairs, each pair of which is made by suitably bending double a single length of bar and each of said pairs having its bend removably secured to one of said points and the remainder of their length curved to conform to the shape of a mold-board, as set forth.

2. The combination, with a plow beam and standard, of a mold-board consisting of a series of disconnected points detachably secured to a series of prongs, said prongs detachably secured to said standard, and a series of bars detachably secured at their forward ends to said points and prongs and having the remainder of their length curved to conform to the shape of a mold-board, as set forth.

3. In a plow, the combination, with a standard having a plow-point on its forward end and a rack-bar secured to said standard and projecting horizontally to one side therefrom at a suitable angle, of a series of disconnected points adjustable on said rack-bar and a series of bars connected to the said points at their forward ends and so curved as to conform to the shape of a mold-board.

4. The combination, in a plow, with a standard having a plow-point on its forward end and a rack-bar secured to and projecting longitudinally to one side at a suitable angle from said standard and a brace for holding in position the outer end of said rack-bar, of a series of disconnected points secured to said rack-bar and a series of bars connected to said points at their forward ends and curved to conform to the shape of a mold-board.

5. In a plow, the combination, with a standard having a plow-point on its forward end, of a series of disconnected points, a corresponding series of prongs connected to said standard, and a series of bars connected to the forward end of said prongs and clamped in position by said points, as set forth.

6. In a plow, the combination, with a standard having a plow-point on its forward end, of a series of shovel-points, each consisting of a spear-shaped plate and a corresponding series of prongs, to the forward ends of each of which one of said points is respectively connected and which are secured to said standard, and a series of bars secured to the forward end of said prongs and securely clamped and held by said points and curved so as to conform to the shape of a mold-board, as set forth.

7. In a plow, the combination, with a standard having a plow-point on its forward end, of a series of disconnected points, each consisting of a spear-shaped plate, a corresponding series of prongs connected to said standard, to the forward end of each of which one of said points is connected, and shoe-plates secured, respectively, to the under side of each of said prongs and to said points, and a series of bars connected to the forward end of said prongs and held and secured in place by said points and curved so as to conform to the shape of a mold-board, as set forth.

JOHN E. MITCHELL.
ELMA M. MITCHELL.

Witnesses:
LIBBIE M. HESS,
NEVA HESS.